(12) United States Patent
Atkins (10) Patent No.: US 10,639,547 B2
(45) Date of Patent: May 5, 2020

(54) NETWORKED SIMULATION METHOD AND APPARATUS

(71) Applicant: Sony Interactive Entertainment Inc., Tokyo (JP)

(72) Inventor: Michael John Atkins, Amsterdam (NL)

(73) Assignee: Sony Interactive Entertainment Inc., Tokyo (JP)

( * ) Notice: Subject to any disclaimer, the term of this patent is extended or adjusted under 35 U.S.C. 154(b) by 177 days.

(21) Appl. No.: 15/896,459

(22) Filed: Feb. 14, 2018

(65) Prior Publication Data

US 2018/0236355 A1     Aug. 23, 2018

(30) Foreign Application Priority Data

Feb. 17, 2017  (GB) .................................. 1702585.9

(51) Int. Cl.
*A63F 13/35* (2014.01)
*A63F 13/358* (2014.01)
*H04L 29/06* (2006.01)

(52) U.S. Cl.
CPC ............ *A63F 13/35* (2014.09); *A63F 13/358* (2014.09); *H04L 67/38* (2013.01); *A63F 2300/535* (2013.01); *A63F 2300/64* (2013.01)

(58) Field of Classification Search
CPC ........ A63F 13/35; A63F 13/358; A63F 13/57; A63F 2300/535; A63F 2300/64; H04L 67/38; G06F 3/011
See application file for complete search history.

(56) References Cited

U.S. PATENT DOCUMENTS

| 4,594,677 A | * | 6/1986 | Barlow | ............... G06F 11/0751 |
| | | | | 703/13 |
| 5,664,106 A | * | 9/1997 | Caccavale | ............... G06F 11/32 |
| | | | | 709/224 |
| 8,678,929 B1 | | 3/2014 | Nishimura | |

(Continued)

FOREIGN PATENT DOCUMENTS

| WO | 0125871 A2 | 4/2001 |
| WO | 0125871 A3 | 4/2001 |

OTHER PUBLICATIONS

European Extended Search Report for corresponding EP Application No. 18156657, 9 pages, dated May 11, 2018.

(Continued)

*Primary Examiner* — Kevin Y Kim
(74) *Attorney, Agent, or Firm* — Matthew B. Dernier, Esq.

(57) ABSTRACT

A method of networked simulation during a multiplayer game for a server includes: simulating at the server at least a first interactive object of a virtual environment, detecting whether a user of a first client may interact with the first interactive object within the virtual environment, and if so, setting the server to a co-operative simulation mode in which the server is arranged to receive data corresponding to an outcome of a simulation by the first client of an interaction between the first interactive object and an avatar of the user; receiving data from the first client corresponding to the outcome of the simulation by the first client of the interaction between the first interactive object and the avatar of the user, and updating the server simulation of the first interactive object responsive to the received data.

15 Claims, 3 Drawing Sheets

(56) References Cited

U.S. PATENT DOCUMENTS

| | | | | |
|---|---|---|---|---|
| 8,852,000 B1 * | 10/2014 | Rhinesmith | ............ | A63F 13/35 |
| | | | | 463/1 |
| 2003/0228903 A1 * | 12/2003 | Shinoda | ................ | G07F 17/32 |
| | | | | 463/25 |
| 2007/0032299 A1 | 2/2007 | Chen | | |
| 2009/0203449 A1 | 8/2009 | Douceur | | |
| 2012/0100912 A1 | 4/2012 | Kim | | |

OTHER PUBLICATIONS

Search Report for corresponding GB Application No. GB1702585.9, 6 pages, dated Aug. 1, 2017.
Office Action for corresponding GB Application No. 1702585.9, 2 pages, dated Apr. 2, 2019.
Communication Pursuant to Article 91(3) EPC for corresponding EP Application No. 18156657.1, 5 pages, dated May 20, 2019.

* cited by examiner

NETWORKED SIMULATION METHOD AND APPARATUS

BACKGROUND OF THE INVENTION

Field of the Invention

The present invention relates to a networked simulation method and apparatus.

Description of the Prior Art

Networked multiplayer videogames typically comprise two or more client devices, such as PCs or videogame consoles, and a server that manages in-game interactions between the players of each client device. In some cases one of the clients also runs as the server (for example during a so-called 'LAN party'), but more frequently the server is a separate and remote system, provided for example by the developers or publishers of a particular videogame.

In either case, there will be one or more clients that have to communicate with the server via a network, and this communication takes a finite and variable time, referred to as 'lag'. This lag corresponds to the ping time between the client and server, and is typically in the order of 50 to 300 ms.

This lag can have a negative impact on a user's experience, because it can mean that when (for example) a user aims and shoots at an enemy on their screen, they are shooting at an enemy location that is (for example) between 50 and 300 ms out of date with respect to the server's game-state; consequently when their actions are analysed by the server, it may conclude that the user actually missed a fast moving enemy that they thought they had hit.

Previous techniques to mitigate this problem have included providing multiple servers and searching for the server with the smallest ping time for a given client; arranging the server to test if the user's shot coincided with an earlier position of an enemy at a time roughly equal to that client's lag; and dropping players from a game when their lag exceeds a threshold amount that may be considered disruptive to other players of the game.

However, with the advent of virtual reality games, the need for a faithful reproduction of players' shared interactions within a networked game environment has become more acute, in part because the immersive nature of such games heightens a user's expectation that the result of their actions will make physical sense within the game world. In such a situation, the above approaches may not be sufficient to provide a good experience; for example the smallest available lag may still be unacceptable, and shifting of the effective timings of interactions to account for lag may cause disorientation or frustration.

Furthermore, the expected fidelity of interactions are expected to be greater, with more precise spatial and temporal accuracy expected, as the user is typically provided with controllers that react to physical motion and hence cause the user to have a virtual kinaesthetic sense of their in-game avatar's interactions with the game world. As a result, interactions that are even just 50 ms out of date (previously a good 'lag' value) can feel unsatisfactory.

The present invention seeks to mitigate this problem.

SUMMARY OF THE INVENTION

In a first aspect, a method of networked simulation during a multiplayer game for a server is provided in accordance with claim 1.

In another aspect, a method of networked simulation during a multiplayer game for a client is provided in accordance with claim 8.

In another aspect, a server adapted to operate within a networked simulation during a multiplayer game is provided in accordance with claim 13.

In another aspect, a client adapted to operate within a networked simulation during a multiplayer game is provided in accordance with claim 15.

Further respective aspects and features of the invention are defined in the appended claims.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, in which.

DESCRIPTION OF THE EMBODIMENTS

Referring now to the drawings, wherein like reference numerals designate identical or corresponding parts throughout the several views, a networked simulation method and apparatus are disclosed. In the following description, a number of specific details are presented in order to provide a thorough understanding of the embodiments of the present invention. It will be apparent however, to a person skilled in the art, that these specific details need not be employed to practice the present invention. Conversely, specific details known to the person skilled in the art are omitted for the purposes of clarity where appropriate.

A device that may act as a videogame client (and indeed as a videogame server) is the Sony® Playstation 4®.

Figure 1:
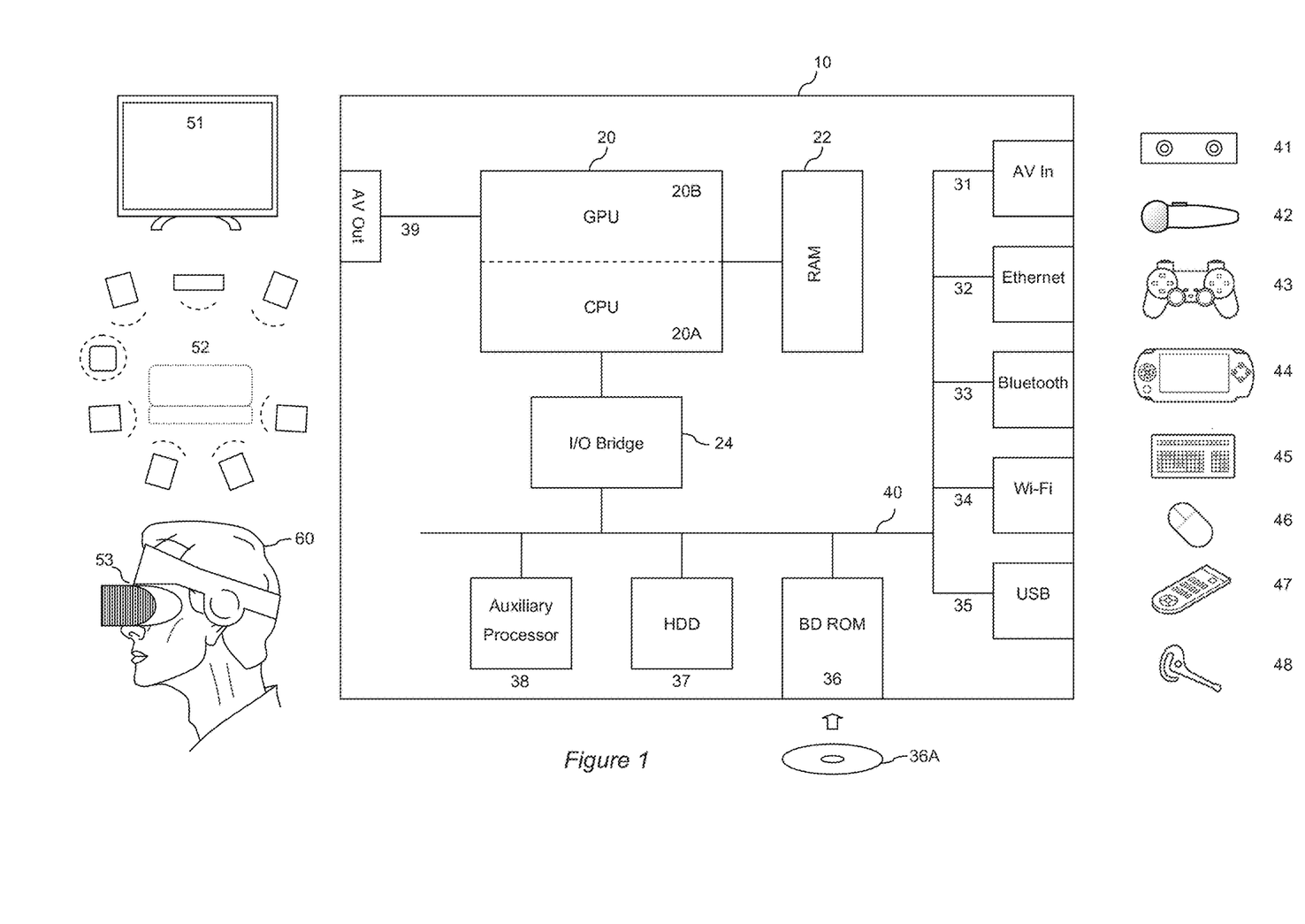
FIG. 1 is a schematic diagram of an entertainment device in accordance with embodiments of the present invention.

FIG. 1 schematically illustrates the overall system architecture of a Sony® PlayStation 4® entertainment device. A system unit 10 is provided, with various peripheral devices connectable to the system unit.

The system unit 10 comprises an accelerated processing unit (APU) 20 being a single chip that in turn comprises a central processing unit (CPU) 20A and a graphics processing unit (GPU) 20B. The APU 20 has access to a random access memory (RAM) unit 22.

The APU 20 communicates with a bus 40, optionally via an I/O bridge 24, which may be a discreet component or part of the APU 20.

Connected to the bus 40 are data storage components such as a hard disk drive 37, and a Blu-ray® drive 36 operable to access data on compatible optical discs 36A. Additionally the RAM unit 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, or one or more universal serial bus (USB) ports 35. Audio and video may be output via an AV output 39, such as an HDMI port.

The peripheral devices may include a monoscopic or stereoscopic video camera 41 such as the PlayStation Eye®; wand-style videogame controllers 42 such as the PlayStation Move® and conventional handheld videogame controllers 43 such as the DualShock 4®; portable entertainment devices 44 such as the PlayStation Portable® and PlayStation Vita®; a keyboard 45 and/or a mouse 46; a media controller 47, for example in the form of a remote control; and a headset 48. Other peripheral devices may similarly be considered such as a printer, or a 3D printer (not shown).

The GPU 20B, optionally in conjunction with the CPU 20A, generates video images and audio for output via the AV output 39. Optionally the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 worn by a user 60.

Regarding peripherals, the system unit is typically provided with at least one hand-held controller 43 such as the DualShock 4®. This controller may be used to interact with user interfaces presented by the system unit that are associated with the operating system and/or a particular game or application being run by the system unit.

The user may also interact with the system unit using a video camera 41 such as the PlayStation Eye®. This may provide monoscopic or stereoscopic video images to the system unit 10 via for example AV input 31. Where these images capture some or all of the user, the user may enact gestures, facial expressions or speech as appropriate to interact with the currently presented user interface.

Alternatively or in addition, a controller designed to assist with camera-based user interaction, such as the PlayStation Move® 42, may be provided. This controller has a wand form factor and an illuminated region that facilitates detection of the controller within a captured video image. Illuminated regions may similarly be provided on other controllers 43, such as on the DualShock 4®. Both kinds of controller comprise motion sensors to detect transverse movement along three axes and rotational movement around three axes, and wireless communication means (such as Bluetooth®) to convey movement data to the system unit. Optionally such controls can also receive control data from the system unit to enact functions such as a rumble effect, or to change the colour or brightness of the illuminated region, where these are supported by the controller.

Similarly, the video and optionally audio may be conveyed to a head mounted display 53 such as the Sony PSVR® display. The head mounted display typically comprises two small display units respectively mounted in front of the user's eyes, optionally in conjunction with suitable optics to enable the user to focus on the display units. Alternatively one or more display sources may be mounted to the side of the user's head and operably coupled to a light guide to respectively present the or each displayed image to the user's eyes. Alternatively, one or more display sources may be mounted above the user's eyes and presented to the user via mirrors or half mirrors. In this latter case the display source may be a mobile phone or portable entertainment device 44, optionally displaying a split screen output with left and right portions of the screen displaying respective imagery for the left and right eyes of the user. Their head mounted display may comprise integrated headphones, or provide connectivity to headphones. Similarly the mounted display may comprise an integrated microphone or provide connectivity to a microphone.

In operation, the entertainment device defaults to an operating system such as a variant of FreeBSD 9.0. The operating system may run on the CPU 20A, the auxiliary processor 38, or a mixture of the two. The operating system provides the user with a graphical user interface such as the PlayStation Dynamic Menu. The menu allows the user to access operating system features and to select games and optionally other content.

In an embodiment of the present invention, the problem of latency between the server and the client for the purposes of high fidelity interactions is mitigated by passing responsibility for simulating an interaction between an interactive object and a user's avatar to the client device of that user. Accordingly the simulated interaction is calculated local to the user and there is no communication lag at the point of interaction at all, beyond any inherent in the client device's internal processing of inputs and the like, which can be assumed to be negligible.

Once the interaction has been simulated and results are passed back to the server, the server resumes responsibility for simulation of the interactive object.

Figure 2:
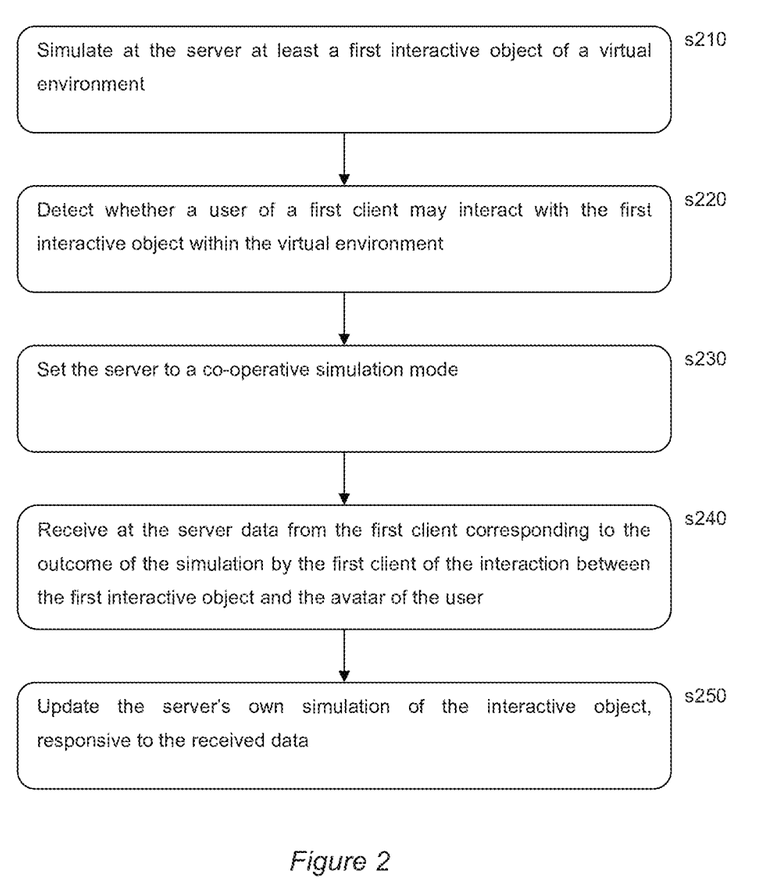
FIG. 2 is a flow diagram of a method of networked simulation during a multiplayer game for a server device in accordance with embodiments of the present invention.

Hence referring now to FIG. 2, in an embodiment of the present invention, a method of networked simulation during a multiplayer game for a server comprises:

In a first step s210, simulating at the server at least a first interactive object of a virtual environment. Typically this first interactive object will be part of a wider virtual environment that is also administered by the server, at least in part (for example, the positions and optionally poses of the avatars of each player from each client may be received by the server and shared to the other clients). The amount of the rest of the virtual environment that is actually simulated by the server will depend upon the specifics of the game itself. For example, if the server does not generate so-called 'bots' or non-player characters that play within the virtual environment, then it may not need to run a model of the environment itself at all, relying instead on the clients to properly constrain the positions and actions of the user's avatars within their own model of the environment and to transmit that positional data to the server faithfully. Alternatively, it may only need to run a minimal version of the environment to determine such information as line-of sight between users, or environmental features that may block or affect the behaviours of the simulated interactive object.

Simulation of the interactive object itself may include a calculation of the virtual forces acting on it, such as gravity, friction, propulsion and the like (for example in the case of a tennis ball), or any decision making logic associated with the interactive logic itself (for example if the object is a bird that the user must coax to them). What forces or behaviours the object is subject to or exhibits is a matter of game design.

A second step s220 then comprises detecting whether a user of a first client may interact with the first interactive object within the virtual environment.

How this is done may vary, depending on the game. As a non-limiting example, in a tennis game the server may detect that the ball has crossed the net into the user's half of the court, and count this a detecting the at the user may interact with the ball. Alternatively, the server may detect if the interactive object is within a threshold distance of the user's avatar (this may be a third-person perspective avatar, or in a virtual reality application, typically the user's avatar is in effect the virtual camera providing them with a first-person view, optionally together with a representation of their hand(s) and optionally their body that they can see). Alternatively, the server may calculate whether the current trajectories of the first interactive object and the user's avatar will intersect to within a threshold distance of each other. In such cases, the threshold distance may be the maximum distance at which the user could interact with the first interactive object (as a non-limiting example, from the avatar locus, a region with a radius equal to the in-game reach of the user's outstretched arm, or arm plus torso length).

If the server detects that in interaction may happen, then in a third step s230 the server is set to a co-operative simulation mode in which the server is arranged to receive data corresponding to an outcome of a simulation by the first client of an interaction between the first interactive object and an avatar of the user.

The first client may start calculating and transmitting simulation data once the co-operative simulation mode has commenced, or at any suitable point after the co-operative simulation mode has commenced. The first client may use the data about the interactive object already received as part of the normal operation of the game to commence simulation, or may receive a more detailed set of simulation parameters as part of a notification signal from the server that the co-operative simulation mode has commenced.

At a minimum however, the first client should transmit simulation parameters describing the outcome of the moment of interaction between the user's avatar and the interactive object. These parameters will vary depending on the nature of the interactive object, the nature of the user's avatar and the nature of the interaction, but typical parameters may include one or more from any or all of the following non-exhaustive lists:

Position, velocity, acceleration, and/or spin (on one or more axes), of the interactive object immediately after the interaction as occurred; and/or Mass, size, colour, shape or orientation of the interactive object immediately after the interaction has occurred; and/or Mood, behaviour, target, trajectory or route of the interactive object immediately after the interaction has occurred.

It will be appreciated that interactions could be as diverse as hitting a ball with a racquet, shooting a transformative magic spell at an object, or stroking an animal in a particular way to domesticate it. Other interactions will be apparent to a game designer. In each case, the fidelity of the interaction (how the ball hits the racquet, where the spell hits the object, or whether the user strokes the animal's back or ears) could have a significant effect on the game's outcome (irrespective of what specific rules, schemes or methods the game employs to advance the game itself). Hence it is advantageous that there is no network communication lag between the user's inputs and the local simulation of the resulting interaction on their client device.

Subsequently, in a fourth step s240, the server receives the data from the first client corresponding to the outcome of the simulation by the first client of the interaction between the first interactive object and the avatar of the user. As noted above, this may take the form of a sequence of simulation results including and optionally also preceding and/or following the moment of interaction, or may only include the moment of interaction itself.

Finally, in a fifth step s250, the server updates its own simulation of the interactive object, responsive to the received data. Typically, this will involve replacing the server's own simulation parameters for the object with those from the first client.

Optionally, during the co-operative simulation period, the first client can ping the server (or vice versa) to get a more up-to-date estimate of the lag between the client and server; using this, the server can use the simulation parameters from the first client, together with the effective time delay due to the lag, to calculate updated simulation parameters from the first client that are correct for the game-world time that is local to the server.

In either case, to update its own simulation of the interactive object, the server may simply replace its own simulation parameters with those of or derived from the first client device.

However, where there is a significant difference in parameter values between the server simulation and the first client's simulation, this could cause an apparent 'jump' or discontinuity of the object in the game world that may be disconcerting to users.

Accordingly, the server may blend the simulations over a plurality of video frames (and hence simulation steps).

Hence in an embodiment of the present invention the updating step comprises the server comparing its own simulation parameters with those from the first client to determine the differences. Optionally if the differences are below a first predetermined threshold (either cumulative, or parameter-respective, or for one or more key parameters such as position), then the server may simply replace its own simulation parameters with those of the first client device because the resulting 'jump' of the object is considered small enough to avoid disrupting play. Alternatively, the server may determine the cumulative, respective or one or more key differences, as appropriate, and calculate a number of frames over which to transition from one set of simulation results to the other. For example, this may be the number of frames needed for the differences in simulation at each frame to be below the above mentioned first predetermined threshold, so that the interactive object transitions from a simulation at the server based on the server's original simulation parameters to a simulation based on the first client's simulation parameters in a series of small steps.

It will be appreciated that in this case a simulation based on the first client's simulation parameters is run by the server in parallel with its own simulation, although potentially if the first client continues to transmit simulation results after the moment of interaction, these transmitted results could be used (optionally with lag correction by the server, as described previously herein). However, this runs the risk of the first client losing connection, changing lag unexpectedly, or stopping its simulation before the necessary transition has finished (although this can be mitigated by the server informing the first client how long it needs to continue simulations).

Hence typically the server will continue to simulate the interaction itself (complete with any imperfections due to lag) so that in the event of packet loss or the like from the client, or the user pressing 'pause' or 'quit' whilst notionally responsible for the simulation, then the server can continue with the game. Also, the server may transmit its own simulations of the interactive object to other clients during the co-operative simulation period so that they do not experience the double lag of transmission time from the first client to the server and thereon to the other clients. As described above, the server then updates its own simulation in response to the simulation data received from the first client, so that other clients see a smooth transition from the original server simulation to the updated server simulation.

It will be appreciated that the transition from server simulation to first client simulation at the server can be similarly implemented by the first client device when it commences local simulation; again a ping may be used to estimate lag between the server and client, and an updated simulation may be calculated. Any difference between the server and client simulations may be transitioned between of a number of video frames/simulation steps, so that the user of the first client does not perceive a significant discontinuity or deviation from expected behaviour just prior to interacting with the object.

Hence in an embodiment of the present invention, the server may calculate a suitable time and/or in-game position of the interactive object at which to enter the co-operative simulation mode, so that there is sufficient time for any such transition between simulations to occur in the first client device before the interaction takes place.

In an embodiment of the present invention, the server can cancel the co-operative simulation at any time, and either use any simulation data it has already received from the first client, or ignore such data and continue to use its own simulation.

Reasons for cancellation can vary. For example, the ping time between the first client and server may exceed a predetermined threshold, or the user of the first client could move in such a manner that an interaction is no longer likely. Another possibility in a multiplayer game is that a user of a second client moves in such a manner that they become more likely to interact with the interactive object than the user of the first client. In such a case, co-operative simulation may cancelled with the first client and commenced with the second client.

Alternatively, co-operative simulation may be conducted with both clients, and the server may evaluate both simulations. In this case, if one simulation transmits simulation data indicating an interaction has occurred with their respective user's avatar, this can be deemed the 'winning' simulation, and the method proceeds as described previously herein based on this winning simulation. In the case that both simulations transmit simulation data indicating that an interaction has occurred with their respective user's avatar (i.e. there is disagreement due to lag-induced errors), then either the earliest interaction can be deemed the winner, or the interaction that is closest to the server's own simulation can be deemed the winner, depending on designer choice.

Hence either when a simulation from client is cancelled or is deemed to be the 'loser', the simulation data from that client is subsequently ignored, either by being discarded after reception, or by no longer accepting the data, as applicable.

Figure 3:
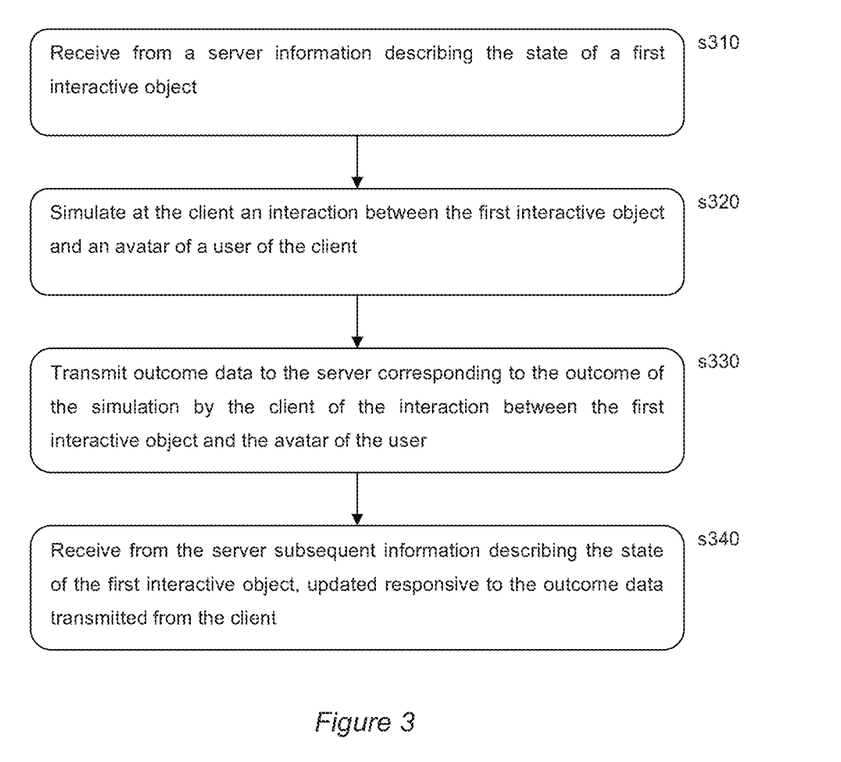
FIG. 3 is a flow diagram of a method of networked simulation during a multiplayer game for a client in accordance with embodiments of the present invention.

Turning now to FIG. 3, in an embodiment of the present invention a method of networked simulation during a multiplayer game for a client comprises:

In a first step s310, receiving from a server information describing the state of a first interactive object. As noted previously herein, this could be data about the interactive object received as part of the normal operation of the game, or specific simulation parameters transmitted as part of a notification to the client that it is now in a co-operative simulation mode with the server.

In a second step s320, the client simulates an interaction between the first interactive object and an avatar of a user of the client. The client may simulate the object continuously, or begin simulation in response to the above mentioned notification. The simulation typically implements the same simulation algorithm as that used by the server and other clients.

In a third steps s330, the client transmits outcome data to the server corresponding to the outcome of the simulation by the client of the interaction between the first interactive object and the avatar of the user. As noted previously, the client may transmit data corresponding to its simulation of the interactive object before and/or after the moment of interaction as well.

As noted previously, the server (or another client—see later herein) then updates its own simulation of the interactive object responsive to this transmitted data corresponding to the outcome of the simulation by the client of the interaction between the first interactive object and the avatar of the user, and does so either instantly or over the course of several video frames/simulation steps.

Consequently, in due course in a fourth step s340, the client receives from the server subsequent information describing the state of the first interactive object, updated responsive to the outcome data transmitted from the client.

In other words, the client receives normal game state information from the server, but with that game state being based on a simulation of the interactive object as updated in response to the client's simulation data.

As noted above, optionally the server can issue a cancellation notice. Accordingly, an embodiment of the present invention comprises the step of the client receiving a cancellation notice from the server; and consequently not transmit outcome data from the client to the server corresponding to the outcome of a simulation by the client of an interaction between the first interactive object and the avatar of the user.

Similarly as noted above, the server may transmit a co-operative simulation mode notification, which optionally comprises simulation parameter data. Accordingly, an embodiment of the present invention comprises the step of the client receiving a notification signal from the server notifying the first client that it should transmit an outcome of simulating an interaction between the first interactive object and the avatar of the user of the first client.

Again as noted above, the server may calculate a suitable time and/or in-game position of the interactive object at which to enter the co-operative simulation mode, so that there is sufficient time for a transition between server and client simulations to occur before the interaction takes place. Accordingly, an embodiment of the present invention comprises the step of the client transitioning from a server-calculated simulation of the interactive object to a client-calculated simulation of the interactive object over a plurality of video frames/simulation steps.

It will be appreciated that the above described methods and techniques allows a multiplayer game (or a server hosted game with one client playing against a server bot) to hand responsibility for the calculation of interactions between objects and players to the client device of a player who is about to make such an interaction, thereby avoiding any issue of ping/lag in the calculation of how that interaction occurs. This in turn allows for much higher fidelity interactions with an interactive object to be modelled in games where that object may be interacted with by multiple avatars, at least one of which represents a user whose client device is remote from the server.

In a variant embodiment of the present invention, the interactive object is only simulated by client devices. For example in a tennis game, the tennis ball may be simulated by a first client when the ball is on the side of the net occupied by the avatar of the first client's user, and the ball may be simulated by a second client when the ball is on the other side of the net occupied by the second client's user.

In this case, each client can take turns fulfilling the role of the server, in a peer-to-peer configuration, or a server can act as a relay between the clients. In this latter case, when each client is not in charge of the simulation process, it receives simulation results and/or game state information from the server as if the server was simulating the interactive object itself. The server then notifies each client that it is in charge of simulating the interactive object as the object transitions from one half of the tennis court to the other. Alternatively, for example in a peer-to-peer configuration, a client can detect this event itself and transmit a notification message to the other client in a similar manner to that described for the server above.

In this sense, each client can act as a server for the other client when it is responsible for the simulation, either by itself (in a peer-to-peer configuration), or together a server acting as a dumb relay to create a combined server, or with the server providing the transition monitoring and optionally the notification to create a combined server.

Similarly in a variant embodiment, all clients simulate the object, but update to an authoritative set of simulation parameters or object state information issued via the network by one of the clients (i.e. by a client whose use has just interacted with the object). Updating can use the techniques previously described herein to smoothly transition the object where the simulations have diverged.

The server may be absent (e.g. in a peer to peer scheme), in which case the effective role of server for the purposes of the herein described techniques falls to the client issuing the current authoritative set of simulation parameters. Alternatively the server may be present but act as a dumb relay for the purposes of the herein described techniques, or may also simulate the object so is can also act as the authoritative source, for example when the object is first spawned, or if it moves beyond a predetermined range of any current users within the game. Where the server is absent, a client device may be nominated to fulfil such a role as needed. For example, the client with the lowest overall pings between the other peers.

Similarly in a variant embodiment, the server acts as a mediator between clients to indicate which client is currently authoritative over the simulation of the object. Once this is indicated, simulation parameters or object state descriptors may be obtained from the authoritative client directly by the other clients, or via the server.

It will be appreciated that the above techniques and methods may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

Hence in an embodiment of the present invention, a server (such as a PlayStation 4® 10, PC, server or other general purpose computing device) adapted to provide networked simulation during a multiplayer game, comprises a simulation processor (such as CPU 20A under suitable software instruction) adapted to simulate at least a first interactive object of a virtual environment; a detection processor (such as CPU 20A under suitable software instruction) adapted to detect whether a user of a first client may interact with the first interactive object within the virtual environment, and if so; a mode setting processor (such as CPU 20A under suitable software instruction) adapted to set the server to a co-operative simulation mode if the detection processor detects that a user of a first client may interact with the first interactive object within the virtual environment; and a receiver (such as Ethernet® port 32 or WiFi® port 34 in conjunction with CPU 20A) arranged, in the co-operative simulation mode, to receive data corresponding to an outcome of a simulation by the first client of an interaction between the first interactive object and an avatar of the user; and in which the simulation processor is adapted to update the simulation of the first interactive object responsive to the received data.

Such a server may be further adapted (for example by suitable software instruction) to implement other features of the methods and techniques described herein. Hence in an embodiment of the present invention, the mode setting processor is adapted to cancel a co-operative simulation between the server and the first client when at least a first criterion is met (such criteria having been discussed previously herein); and is adapted to instigate a new co-operative simulation of the first interactive object between the server and a second client.

Similarly, in an embodiment of the present invention a client (such as a PlayStation 4® 10, PC, or other general purpose computing device) adapted to operate within a networked simulation during a multiplayer game, comprises a receiver (such as Ethernet® port 32 or WiFi® port 34 in conjunction with CPU 20A) adapted to receive from a server information describing the state of a first interactive object simulated by the server; a simulation processor (such as CPU 20A under suitable software instruction) adapted to simulate an interaction between the first interactive object and an avatar of a user of the client; a transmitter (such as Ethernet® port 32 or WiFi® port 34 in conjunction with CPU 20A) adapted to transmit outcome data from the client to the server corresponding to the outcome of the simulation by the simulation processor of the interaction between the first interactive object and the avatar of the user; and in which the receiver is adapted to receive from the server subsequent information describing the state of the first interactive object simulated by the server, updated responsive to the outcome data transmitted from the client.

Again, such a client may be further adapted (for example by suitable software instruction) to implement other features of the methods and techniques described herein.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of networked simulation during a multiplayer game for a server, comprising the steps of:
   simulating at the server at least a first interactive object of a virtual environment;
   detecting whether a user of a first client may interact with the first interactive object within the virtual environment, and if so;
   setting the server to a co-operative simulation mode in which the server passes responsibility for simulating the first interactive object in the virtual environment, and receives data corresponding to an outcome of a co-operative simulation by the first client of an interaction between the first interactive object and an avatar of the user;
   receiving data from the first client corresponding to the outcome of the simulation by the first client of the interaction between the first interactive object and the avatar of the user;
   updating the server simulation of the first interactive object responsive to the received data; and
   re-setting the server out of the co-operative simulation mode in which the server recovers responsibility for simulating the first interactive object in the virtual environment.

2. The method of claim 1, in which the step of setting the server to the co-operative simulation mode comprises the step of transmitting a notification signal to the first client notifying the first client that it should transmit an outcome of simulating an interaction between the first interactive object and the avatar of the user of the first client.

3. The method of claim 1, in which the step of setting the server to the co-operative simulation mode comprises the step of calculating one or more selected from the list consisting of: (i) a time; and (ii) a position of the first interactive object within the virtual environment, at which to set the server to the co-operative simulation mode.

4. The method of claim 1, comprising the step of cancelling the co-operative simulation between the server and the first client.

5. The method of claim 4, comprising the step of instigating a new co-operative simulation of the first interactive object between the server and a second client.

6. The method of claim 4, comprising the step of ignoring an outcome of the co-operative simulation of the interaction between the first interactive object and the avatar of the user of the first client transmitted from the first client.

7. The method of claim 1, comprising the step of
   simulating at the server the interaction between the first interactive object and the avatar of the user of a client,
   wherein the step of updating the server simulation of the first interactive object responsive to the received data from the client comprises transitioning from server-calculated simulation parameters to client-calculated simulation parameters over a plurality of video frames.

8. A method of networked simulation during a multiplayer game for a client, comprising the steps of:
   receiving from a server information describing a state of a first interactive object resulting from simulating at the server the first interactive object in a virtual environment, upon detecting that the client may interact with the first interactive object within the virtual environment, and upon entering a co-operative simulation mode in which the server passes responsibility for simulating the first interactive object in the virtual environment from the server to the client;
   simulating, at the client, an interaction between the first interactive object and an avatar of a user of the client;
   transmitting outcome data from the client to the server corresponding to the outcome of the simulation by the client of the interaction between the first interactive object and the avatar of the user;
   receiving from the server subsequent information describing the state of the first interactive object, updated responsive to the outcome data transmitted from the client; and
   re-setting the server out of the co-operative simulation mode in which the server recovers responsibility for simulating the first interactive object in the virtual environment.

9. The method of claim 8, comprising the steps of:
   receiving a cancellation notice from the server; and
   not transmitting outcome data from the client to the server corresponding to the outcome of a simulation by the client of an interaction between the first interactive object and the avatar of the user.

10. The method of claim 8, comprising the step of receiving a notification signal from the server notifying the first client that it should transmit an outcome of simulating an interaction between the first interactive object and the avatar of the user of the first client.

11. The method of claim 10, comprising the step of: transitioning from a server-calculated simulation of the interactive object to a first client-calculated simulation of the interactive object over a plurality of video frames.

12. A non-transitory, computer readable medium having stored thereon computer executable instructions adapted to cause a computer system to perform actions to carry out a method of networked simulation during a multiplayer game for a server, comprising the steps of:
   simulating at the server at least a first interactive object of a virtual environment;
   detecting whether a user of a first client may interact with the first interactive object within the virtual environment, and if so;
   setting the server to a co-operative simulation mode in which the server passes responsibility for simulating the first interactive object in the virtual environment, and receives data corresponding to an outcome of a co-operative simulation by the first client of an interaction between the first interactive object and an avatar of the user;
   receiving data from the first client corresponding to the outcome of the simulation by the first client of the interaction between the first interactive object and the avatar of the user;
   updating the server simulation of the first interactive object responsive to the received data; and
   re-setting the server out of the co-operative simulation mode in which the server recovers responsibility for simulating the first interactive object in the virtual environment.

13. A server adapted to operate within a networked simulation during a multiplayer game, the server comprising:
   a simulation processor adapted to simulate at least a first interactive object of a virtual environment;
   a detection processor adapted to detect whether a user of a client may interact with the first interactive object within the virtual environment;
   a mode setting processor adapted to set the server to a co-operative simulation mode in which the server passes responsibility for simulating the first interactive object in the virtual environment, and receives data corresponding to an outcome of a co-operative simulation by the client of an interaction between the first interactive object and an avatar of the user;

a receiver arranged, in the co-operative simulation mode, to receive data corresponding to the outcome of the simulation by the client of the interaction between the first interactive object and the avatar of the user; wherein the simulation processor is adapted to update the simulation of the first interactive object responsive to the received data, and the mode setting processor is adapted to re-set the server out of the co-operative simulation mode in which the server recovers responsibility for simulating the first interactive object in the virtual environment.

14. The server of claim 13, in which the mode setting processor is adapted to cancel a co-operative simulation between the server and the first client when at least a first criterion is met; and is adapted to instigate a new co-operative simulation of the first interactive object between the server and a second client.

15. A client adapted to operate within a networked simulation during a multiplayer game, the client comprising:

a receiver adapted to receive from a server information describing a state of a first interactive object resulting from simulating at the server the first interactive object in a virtual environment, upon detecting that the client may interact with the first interactive object within the virtual environment, and upon entering a co-operative simulation mode in which the server passes responsibility for simulating the first interactive object in the virtual environment from the server to the client;

a simulation processor adapted to simulate an interaction between the first interactive object and an avatar of a user of the client;

a transmitter adapted to transmit outcome data from the client to the server corresponding to the outcome of the simulation by the simulation processor of the interaction between the first interactive object and the avatar of the user, wherein the receiver is adapted to receive from the server subsequent information describing the state of the first interactive object, updated responsive to the outcome data transmitted from the client, and the server is adapted to exit from the co-operative simulation mode in which the server recovers responsibility for simulating the first interactive object in the virtual environment.

\* \* \* \* \*